(12) United States Patent
Fleming et al.

(10) Patent No.: US 8,924,666 B2
(45) Date of Patent: Dec. 30, 2014

(54) MANAGING STORAGE DEVICES IN A CLOUD STORAGE ENVIRONMENT

(75) Inventors: Mark S. Fleming, Tucson, AZ (US); Jiang Peng, Shanghai (CN); Rong Zhang, Shanghai (CN); Zhang Xin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 13/602,051

(22) Filed: Aug. 31, 2012

(65) Prior Publication Data

US 2013/0086340 A1    Apr. 4, 2013

(30) Foreign Application Priority Data

Sep. 30, 2011    (CN) .......................... 2011 1 0305476

(51) Int. Cl.
| | |
|---|---|
| G06F 12/16 | (2006.01) |
| G06F 3/06 | (2006.01) |
| G06F 11/20 | (2006.01) |
| H04L 29/14 | (2006.01) |

(52) U.S. Cl.
CPC .............. *G06F 3/0605* (2013.01); *G06F 3/067* (2013.01); *G06F 11/2094* (2013.01); *G06F 3/0665* (2013.01); *H04L 69/40* (2013.01)
USPC ....................................................... 711/161

(58) Field of Classification Search
None
See application file for complete search history.

(56) References Cited

U.S. PATENT DOCUMENTS

| | | |
|---|---|---|
| 2006/0136525 A1 | 6/2006 | Akelbein |
| 2010/0011368 A1 | 1/2010 | Arakawa et al. |
| 2010/0153482 A1 | 6/2010 | Kim et al. |
| 2010/0198972 A1 | 8/2010 | Umbehocker |
| 2010/0217944 A1 | 8/2010 | DeHaan et al. |
| 2010/0250748 A1 | 9/2010 | Sivasubramanian et al. |
| 2011/0022642 A1 | 1/2011 | deMilo et al. |
| 2011/0029729 A1* | 2/2011 | Zwisler et al. ................ 711/114 |
| 2011/0029882 A1 | 2/2011 | Jaisinghani |
| 2011/0035248 A1 | 2/2011 | Juillard |

FOREIGN PATENT DOCUMENTS

| | | |
|---|---|---|
| CN | 101997918 A | 3/2011 |
| CN | 102147770 A | 8/2011 |

OTHER PUBLICATIONS

Office Action from Chinese Application No. 201110305476.2, dated Nov. 4, 2014.

* cited by examiner

*Primary Examiner* — Duc Doan
(74) *Attorney, Agent, or Firm* — Zilka-Kotab, PC

(57) ABSTRACT

A method of managing storage devices including storage resources that are virtualized and integrated into corresponding intermediate volumes, wherein the intermediate volumes are virtualized and integrated into individual logical volumes. The method comprises acquiring storage resource requirements presented to the logical volumes where the requirements comprise redundancy, obtaining storage resources available from respective intermediate volumes, selecting intermediate volumes to satisfy the storage resource requirements based on the requirements and available storage resources, where a minimum number of the intermediate volumes is determined based on the required redundancy, and storing user data in selected intermediate volumes based on the required redundancy.

18 Claims, 5 Drawing Sheets

MANAGING STORAGE DEVICES IN A CLOUD STORAGE ENVIRONMENT

BACKGROUND

The invention relates to storage technology, and more particularly, to a method and apparatus for managing storage devices.

In a cloud storage environment, i.e., a storage-as-a-service environment, a storage service provider provides a certain storage resource as required by a user application and charges per the required storage resource. Generally, a requirement on a storage resource is described according to the requirement on performance measurements of the storage resource. The performance measurements refer to for example, storage capacity, access rate, and storage redundancy, etc. From the perspective of user application, an actual storage device is totally transparent. However, from the perspective of the service provider, a complex management is needed.

In a traditional storage environment, a plurality of methods of managing storage devices have been proposed. These methods may be categorized into two approaches: simplifying volume allocation and automatically deciding on volume allocation. According to the approach of simplifying volume allocation, predefined criteria such as scripts are used to simplify processes like allocating and mapping storage devices. However, this approach can only perform static management of volumes of storage devices. According to the approach of automatically deciding on volume allocation, a storage device that can provide storage resources required by a user application is allocated to the user application by monitoring the actual running performance of the storage device. This approach assumes that the user application's requirements on storage resources may be satisfied by an individual storage device.

However, neither of the above approaches may be directly applied to a cloud storage environment. In a cloud storage environment, the storage resources required by a user application may be provided by a plurality of storage devices. For example, the storage volume required by the user application is provided by a plurality of storage devices; the access rate required by the user application is realized through allocating an access request to the plurality of storage devices; the redundancy required by the user application is provided by providing additional storage devices. However, the actual storage devices employed by the provider are of different types and thus have different capacities. Some devices may not have error-tolerance capacity. In this case, it is quite different from a traditional storage environment in aspects of how to allocate user data to actual storage devices, how to perform dynamic adjustment when the requirements of the user application change, how to guarantee the redundancy required by the user application, and how to carry out data recovery and reallocation when error happens.

It is thus desirable to have a method of managing storage devices in a cloud storage environment.

SUMMARY OF THE INVENTION

The invention provides a method and apparatus for managing storage devices.

Embodiments of the invention relate to a method of managing a plurality of storage devices wherein storage resources provided by respective storage devices are virtually integrated into corresponding intermediate volumes, and a plurality of intermediate volumes are virtually integrated into individual logical volumes. The method comprises acquiring storage resource requirements presented to the logical volumes, the requirements at least comprising redundancy; obtaining storage resources available from the respective intermediate volumes; selecting intermediate volumes to satisfy the storage resource requirements based on the storage resource requirements and the storage resources available from respective intermediate volumes, wherein a minimum number of the intermediate volumes is determined based on the redundancy; and storing the user data into the selected intermediate volumes based on the requirement of redundancy.

An apparatus is described for managing a plurality of storage devices, wherein storage resources provided by respective storage devices are virtually integrated into corresponding intermediate volumes, and a plurality of intermediate volumes are virtually integrated into individual logical volumes. The apparatus comprises a requirement acquiring module configured to acquire storage resource requirements presented to the logical volumes, the requirements at least comprising redundancy; a storage resource obtaining module configured to obtain storage resources available from the respective intermediate volumes; intermediate volume selecting module configured to select intermediate volumes to satisfy the storage resource requirements based on the storage resource requirements and the storage resources available from respective intermediate volumes, wherein a minimum number of the intermediate volumes is determined based on the redundancy; and a user data storing module configured to store the user data into the selected intermediate volumes based on the requirement of redundancy.

Embodiments of the invention provide effective management of storage devices in a cloud storage environment.

DETAILED DESCRIPTION

Figure 1:
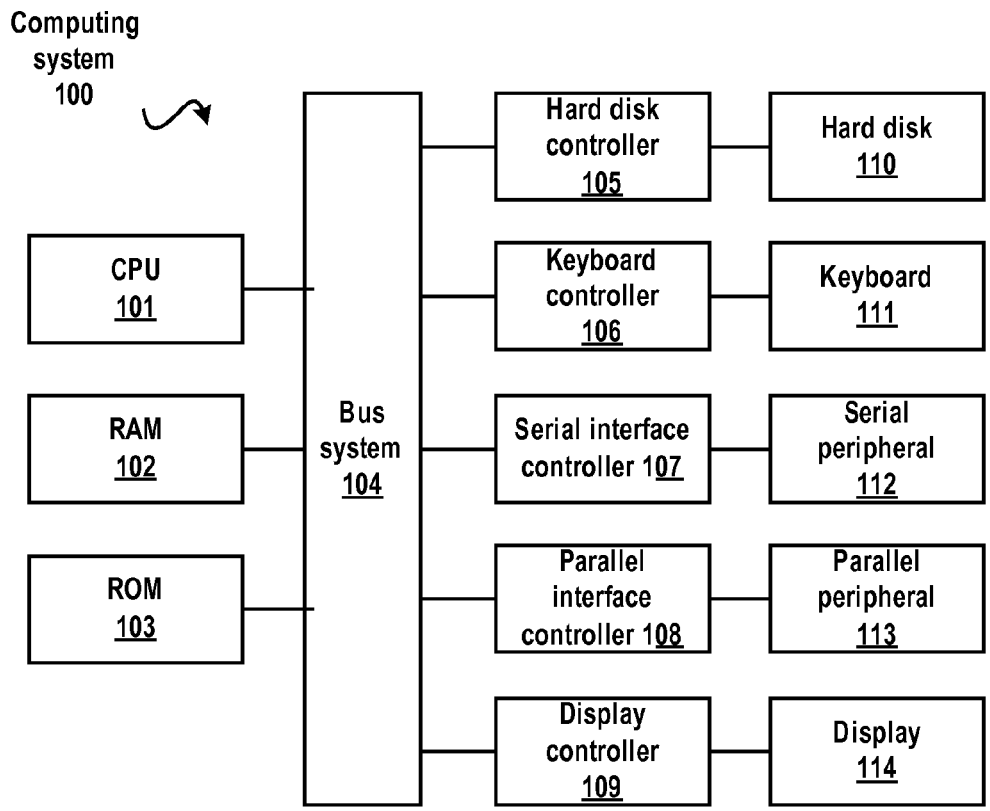
FIG. 1 illustrates a block diagram of an exemplary computing system 100 that is adapted to implement the embodiments of the invention.

Those skilled in the art would appreciate that various aspects of the invention may be embodied as an apparatus, a method, or a computer program product. Thus, embodiments of the invention may be implemented in the following manners, namely, hardware, software (including firmware, resident software, microcode, etc), or a combination of software and hardware as generally called "circuit," "module," or "system" in this text. Various aspects of the invention may adopt a manner of computer program product that is embodied in one or more computer readable mediums that comprise computer usable program codes.

Any combination of one or more computer-readable mediums may be used. The computer readable medium may be a computer readable signal medium or computer readable storage medium. The computer-readable medium may be for example, but not limited to, electrical, magnetic, optical, electromagnetic, infrared, or semiconductor system, means, device, or propagation medium, or a combination of any of the above. More specific examples (non-exhaustive list) of the computer-readable storage medium comprise the following: an electric connection having one or more leads, a portable computer magnetic disk, hard disk, random access memory (RAM), read-only memory (ROM), erasable programmable read-only memory (EPROM or flash disk), optical fiber, portable compact disk read-only memory (CD-ROM), optical storage device, a magnetic storage device, or any suitable combination of the above. In the context of this document, the computer readable medium may be any tangible medium that contains or stores a program that is used by an instruction execution system, means or device or used in combination therewith.

A computer-available signal medium may comprise a data signal contained in a base band or propagated as a part of carrier and embodying propagation of a computer-available program code. Such propagated signal may employ a plurality of forms, including, but not limited to, electromagnetic signal, optical signal, or any suitable combination thereof. A computer readable signal medium might not be a computer readable storage medium, but any compute readable medium that may send, propagate, or transmit a program that is used by an instruction execution system, means or device or used in combination therewith. A program code that is embodied on the computer-readable program medium may be transmitted by any suitable medium, including, but not limited to, radio, wire, cable, or RF, etc, or any suitable combination of the above.

A program code that is embodied on the computer-readable program medium may be transmitted by any suitable medium, including, but not limited to, radio, wire, cable, or RF, etc, or any suitable combination of the above.

A computer program code for executing operation of the invention may be complied by any combination of one or more program design languages, the program design languages including object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example using an internet service provider via Internet).

Hereinafter, various aspects of the invention will be described with reference to the method, apparatus (system) and flow chart and/or block diagram of the computer program product according to the embodiments of the invention. It should be understood that each block in the flow charts and/or block diagrams and combination of each block in the flow charts and/or block diagrams of the invention may be implemented by computer program instructions. These computer program instructions may be provided to a processor of a utility computer, a dedicated computer or other programmable data processing apparatus, to thereby generating a machine such that these instructions executed through the computer or other programmable data processing apparatus generate means for implementing functions/operations prescribed in the blocks of the flow charts and/or block diagrams.

These computer program instructions may also be stored in a computer-readable medium capable of instructing the computer or other programmable data processing apparatus to work in a particular manner, such that the instructions stored in the computer-readable medium generate a product including instruction means for implementing the functions/operations prescribed in the flow charts and/or block diagrams.

The computer program instructions may also be loaded on a computer or other programmable data processing apparatus, such that a series of operation steps are implemented on the computer or other programmable data processing apparatus, to generate a computer-implemented process, such that execution of the instructions on the computer or other programmable apparatus provides a process of implementing the functions/operations prescribed in the blocks of the flow charts and/or block diagrams.

Hereinafter, the invention will be described through example embodiments with reference to the drawings. Such depiction is only for illustration purpose, not intended to limit the scope of the invention.

FIG. 1 illustrates a block diagram of an exemplary computing system 100 that is adapted to implement the embodiments of the invention. As illustrated in FIG. 1, the computer system 100 may comprise: a CPU (Central Processing Unit) 101, a RAM (Random Access Memory) 102, a ROM (Read Only Memory) 103, a system bus 104, a hard disk controller 105, a keyboard controller 106, a serial interface controller 107, a parallel interface controller 108, a display controller 109, a hard disk 110, a keyboard 111, a serial peripheral device 112, a parallel peripheral device 113 and a display 114. Among these components, coupled to the system bus 104 are the CPU 101, the RAM 102, the ROM 103, the hard disk controller 105, the keyboard controller 106, the serial interface controller 107, the parallel interface controller 108 and the display controller 109. The hard disk 110 is coupled to the hard disk controller 105; the keyboard 111 is coupled to the keyboard controller 106; the serial peripheral device 112 is coupled to the serial interface controller 107; the parallel peripheral device 113 is coupled to the parallel interface controller 108; and the display 114 is coupled to the monitor controller 109. It should be understood that the structural block diagram in FIG. 1 is shown only for illustration purpose, and is not intended to limit the scope of the invention. In some cases, some devices may be added or reduced as required.

The invention provides a method of automatically providing storage devices, which may satisfy a user's high requirements on performance measurements of storage resources utilizing collective capacity of low-end storage devices. Generally speaking, a low-end storage device is prone to physical faults, which causes malfunction of the whole storage device.

Figure 2:
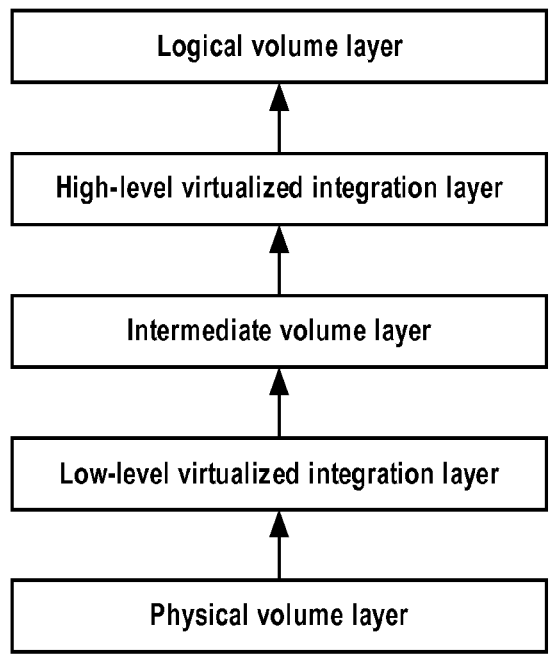
FIG. 2 is a hierarchical diagram of organizing storage devices according to an embodiment of the invention.

FIG. 2 is a hierarchical diagram of organizing storage devices according to an embodiment of the invention.

As illustrated in FIG. 2, the bottom layer in the hierarchy is a physical volume layer. Physical volumes correspond to physical storage resources on storage mediums. A storage device may have a plurality of storage mediums, for example, a plurality of disks. According to an embodiment of the invention, each disk is taken as a physical volume. Those skilled in the art may understand that each disk may be divided into a plurality of physical volumes.

Above the physical volume layer is a low-level virtualized integration layer, which performs virtualized integration to the storage resources on a plurality of storage mediums on the storage device, so as to establish an intermediate layer. How to perform a virtualized integration is customary means in the art, which will not be described in detail here.

Now, an example is provided to better understand the concepts of physical volumes and intermediate volumes. Suppose a storage device has five disks and the storage capacity of each disk is 1000 GB. If each 10 GB is a physical volume, then each disk corresponds to 100 physical volumes, and therefore the storage device corresponds to 500 physical volumes. If the storage device is to provide an intermediate volume with a storage capacity of 50 GB, then the 50 GB storage resource corresponds to this intermediate volume may be distributed in various physical volumes in a plurality of manners. The low-level virtualized integration layer manages the physical volumes in a certain fashion such that the physical volumes are totally transparent to the intermediate volume. Therefore, from the perspective of intermediate volume, it does not care a specific storage resource is provided by which disk. Additionally, if a physical volume corresponding to an intermediate volume fails, the access to the data stored in the intermediate volume will not be affected by the failure because there is a redundancy mechanism of the low-level virtualized integration layer.

Those skilled in the art would understand that if there exist a plurality of storage devices, the physical volumes corresponding to the intermediate volume may be distributed in the plurality of storage devices. However, in an organization structure of storage devices according to the embodiments of the invention, each intermediate volume in the intermediate volume layer merely corresponds to one storage device, and the intermediate volume corresponds to all physical volumes of the storage device. In other words, there is one-to-one correspondence between the intermediate volumes and the storage devices.

Above the intermediate volume layer is a high-level virtualized integration layer. The high-level virtualized integration layer performs virtualized integration to all intermediate volumes within the entire cloud storage system, thereby forming a logical volume layer.

A further example is provided to better understand the relation between intermediate volumes and logical volumes. In a cloud storage system, each logical volume corresponds to a user application. Hereinafter, a logical volume and a user application have an identical reference object, unless otherwise indicated. For example, if a user application requires a 100 GB storage resource, then the cloud storage system will allocates a 100 GB logical volume to the user application. This 100 GB logical volume may correspond to intermediate volumes in various manners. It may correspond to 50 GB on intermediate volume #1, 10 GB on intermediate volume #2, and 40 GB on intermediate volume #3. In other words, this 100 GB logical volume may correspond to the storage device in various manners. For example, it may correspond to 20 GB on intermediate volume #1, 50 GB on intermediate volume #2, and 30 GB on intermediate volume #3.

The high-level virtualized integration layer manages the intermediate volumes in a certain fashion such that the intermediate volumes are totally transparent to the logical volume, and further the physical volumes are also totally transparent to the logical volume. For example, if an intermediate volume corresponding to a logical volume fails, the access to the data stored in the logical volume will not be affected by the failure, because there is a redundancy mechanism of the high-level virtualized integration layer.

Figure 3:
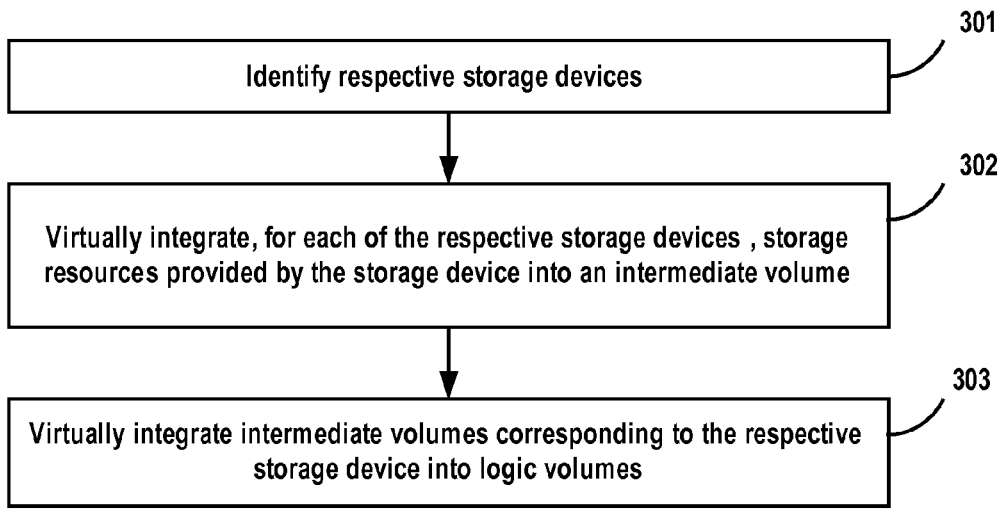
FIG. 3 is a flow chart of establishing the hierarchical structure of FIG. 2.

Hereinafter, it will be described how to establish the hierarchical structure of FIG. 2 with reference to FIG. 3.

At step 301, respective storage devices are identified.

At step 302, for each of the respective storage devices, storage resource provided by the storage device is virtually integrated into an intermediate volume.

At step 303, intermediate volumes corresponding to respective storage devices are virtually integrated into logical volumes.

The reason of using "volume" instead of "pool" is that a volume management device will copy for one piece in each volume the metadata information about each volume recorded in the system. In this way, even if the volume management device fails, a new volume management device may be used to recover the managed volume.

Figure 4:
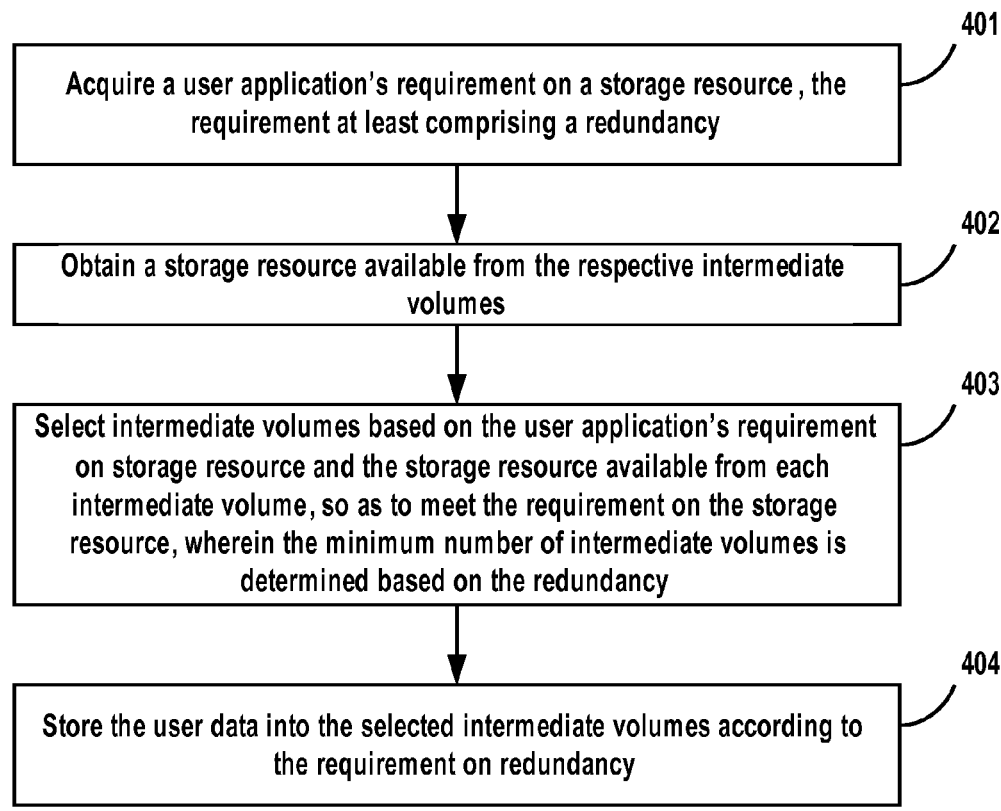
FIG. 4 is a flow chart of selecting storage resources to satisfy a user application's requirements on storage resources.

Hereinafter, it will be described with reference to FIG. 4 how to select a storage resource to satisfy a user application's requirement when receiving the user application's requirement.

At step 401, a user application's requirement on storage resource is obtained, the requirement at least comprising redundancy.

According to an embodiment of the invention, a requirement on performance measurements of storage resource may be directly designated by a user. According to another embodiment of the invention, a plurality of application templates may be provided to the user, and then the user application's requirements on the performance measurements of storage resource may be inferred based on the user's selection among these templates and the parameter settings of the selected template. How to perform such inferences is customary means in the art, which will not be described in detail here.

At step 402, storage resource available from the respective intermediate volumes is obtained.

An existing tool may be used to monitor and obtain the real-time utilization condition of each intermediate volume in a storage cloud and to calculate the specific numerical value of current idle storage capacity and idle access rate with respect to each intermediate volume.

As mentioned above, in the embodiments according to the invention, there is one-to-one correspondence between intermediate volumes and storage devices. Therefore, in the following description, the terms "intermediate volume" and "storage device" designate the same object.

At step 403, based on the user application requirement on storage resource and the storage resource available from each intermediate volume, intermediate volumes are selected to satisfy the requirement on storage resource, wherein the minimum number of the intermediate volumes is determined based on the redundancy requirement.

For example, a user application's requirement on storage resource is specified below:
  redundancy: RAID5(4+P)
  storage capacity: 800 GB
  access rate: 10000 IPOS First, the minimum number of storage devices is determined based on the redundancy. The redundancy RAID 5 (4+P) indicates that in the storage capacity actually allocated to the user application, one fifth, i.e., 20%, is used as redundancy storage, and the remaining four fifths, i.e., 80%, is used for satisfying the user application's requirement on storage volume. Based on this performance measurement, the minimum number of selected storage devices is 5. Those skilled in the art would understand that the redundancy may also be indicated by other ways, but all of them can be converted into the above relation.

Second, based on the storage resources available from respective storage devices as obtained at step 402, it is determined whether 5 storage resources exist with each providing a 200 GB, 2000IOPS storage resource and these storage resources come from different storage devices. As described above, only 4 of these 5 storage resources are used to satisfy the user application's requirement on storage capacity. In the case of existence, the 5 storage resources are named as A, B, C, D, E, respectively.

If the above mentioned storage resources cannot be found within the entire storage cloud, then a second search is performed by halving all measurements. For example, only 4 storage resources A, B, C, D that may respectively provide 200 GB, 2000IOPS and come from different storage devices can be found; while in the second search, another 2 storage resources E1, E2 that may respectively provide 100 GB, 1000IOPS, then they are merged into a storage resource E. It would be appreciated that E1 and E2 cannot be located at a same storage device as any one of A, B, C, or D. It would be also appreciated that E1 and E2 would not be located at the same storage device either, because if E1 and E2 are located at the same storage device, E would be found in the first search. Because E1 and E2 will work concertedly in a strip (RAID0) fashion, their merged space just has the performance measurements of 200 GB, 2000IOPS. If such storage resources cannot be found yet, then all the measurements are halved again to perform a third search.

If the storage resources satisfying the above condition in the storage cloud exceed the required number, then further screening may be performed. According to one embodiment of the invention, storage resources on activated storage devices are selected, instead of activating new storage devices, so as to save additional energy consumption incurred by activating new storage devices. According to another embodiment of the invention, storage resources on those storage devices with less occupied storage resources are selected to thereby guarantee load balance on respective storage devices. According to a further embodiment of the invention, user data of different user applications are allocated as far as possible to the storage resources on different storage devices, such that change of a certain user application's requirement on performance measurements of a storage resource will not affect other user application, and moreover, security is enhanced due to physical isolation of user data. The above screening approach may be designated by the user.

In one embodiment, a thin-provision policy may be adopted with respect to the measurement of access rate. According to this policy, although the system nominally successfully allocates to the user application a piece of storage resource that meets the access rate required by the user application, it actually does not fully occupy the access rate. For example, if a piece of storage resource on a storage device with the maximum access rate of 10000IOPS is allocated to the user application so as to provide a 2000IOPS access rate to the user application, then the idle access rate of the storage device is not simply 10000 minus 2000; instead, the idle access rate of the storage device is calculated based on the actually occupied access rate as obtained at step 402. In this way, the access rate of the storage device may be utilized to the utmost. In order to avoid excessive access rate being allocated on the storage device due to over fluctuation of the actually occupied access rate with time, the above actually occupied access rate always takes an average value within a period of time.

At step 404, the user data are stored into the selected intermediate volumes according to the redundancy requirement.

Still take the above redundancy RAID5 (4+P) as the example. Suppose the current user data are divided into 16 user data blocks according to a minimum element, then based on the redundancy requirement, each 4 user data blocks need to be equipped with 1 redundant data block. Thus, the user data may be divided into 4 block groups, as specified below:

| Block group 1 | User data block 1 | User data block 2 | User data block 3 | User data block 4 | Redundant data block 1 |
|---|---|---|---|---|---|
| Block group 2 | User data block 5 | User data block 6 | User data block 7 | User data block 8 | Redundant data block 2 |
| Block group 3 | User data block 9 | User data block 10 | User data block 11 | User data block 12 | Redundant data block 3 |
| Block group 4 | User data block 13 | User data block 14 | User data block 15 | User data block 16 | Redundant data block 4 |

According to one embodiment of the invention, the 1 redundant data block is obtained through performing parity check operation to the 4 user data blocks. In this way, from any arbitrary 4 data blocks among the 1 redundant data block plus 4 user data blocks, another data block may be inferred. Then, user data blocks and redundant data blocks belong to the same block group will be allocated into one of the selected 5 storage resources. According to one embodiment of the invention, redundant data blocks in each block group are allocated in rotation. For example, the redundant data block 1 is allocated into the first storage resource, the redundant data block 2 is allocated into the second storage resource, the redundant data block 3 is allocated into the third storage resource, and the redundant data block 6 is allocated into the first storage resource. In this way, system reliability may be further improved.

Those skilled in the art would appreciate that after a data block is allocated to a certain storage resource, the storage device where the storage resource is allocated may store the data block properly based on its own error-tolerance mechanism.

In the depiction with reference to FIG. 2, it is mentioned that each intermediate volume in the intermediate volume layer merely corresponds to one storage device, and the intermediate volume corresponds to all physical volumes on the storage device. At steps 403 and 404, it is mentioned that redundant data blocks and user data blocks in the same block group are allocated to different intermediate volumes, respectively, i.e., allocated to different storage devices. Thus, even if a storage device collapses completely, for a block group, only one data block is affected, while such impact may be eliminated through the redundancy. Further, as previous mentioned, if an intermediate volume corresponding to a logical volume fails, the access to the data stored in the logical volume will not be affected by the failure because there is a redundancy mechanism of the high-level virtualized integration layer. However, extra calculation is needed to perform data access through the redundancy mechanism, thus it is still desirable to seek an alternative storage resource.

Hereinafter, when a storage device state changes, the operation process according to the embodiments of the invention will be described with reference to FIG. 5 and FIG. 6.

In brief, a provisioning system according to the embodiments of the invention monitors the access rate conditions on respective storage devices, including an actual access rate and an idle access rate, etc. If the access rate of the storage device cannot meet the requirements of the user application or the provisioning system finds that other non-vital error occurs to the storage device, then the provisioning system may correct these non-vital errors through carrying out voluntary data migration. If a vital error occurs to the storage device such that the storage device completely collapses, the provisioning system will be subjected to passive restructuring.

Change of the storage device state may be categorized into four scenarios. The first one is to remove storage resource on a storage device, for example, removing a physical volume, and etc. The second one is to remove existing storage devices, for example a storage device collapses completely due to failure. The third one is to add storage resource to a storage device, for example, increasing a disk, and etc. And the fourth one is to add a new storage device. For the third and fourth scenarios, it is only required to virtually integrate the newly added storage resource or newly added storage device into the cloud storage system and update relevant metadata information.

Figure 5:
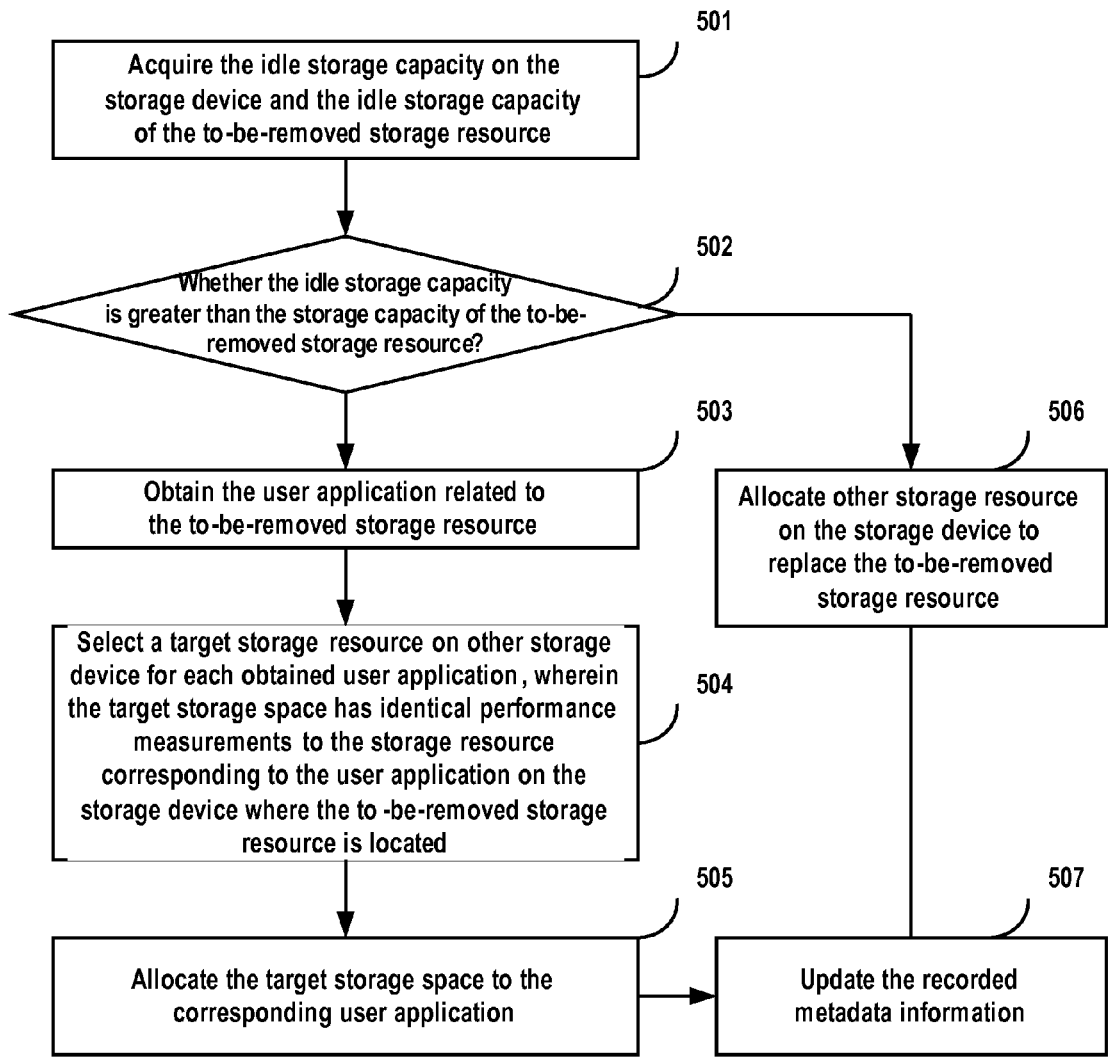
FIGS. 5 and 6 are operational flow charts when states of storage devices change.

FIG. 5 is an operation process upon removing a storage resource from a storage device.

Removal of the storage resource in a storage device may be voluntarily initiated by an administrator of the cloud storage system in order to, for example, check or replace a disk, or carried out passively in cases of disk failure.

At step 501, the idle storage capacity of the storage device and the storage capacity for to-be-removed resource are obtained.

At step 502, it is determined whether the idle capacity is greater than the storage capacity of the storage resource to be removed; if so, then the process proceeds with step 503; otherwise, it proceeds with step 506.

According to one embodiment of the invention, if removal of a storage resource is voluntarily initiated by the administrator, then when the idle storage capacity is less than the storage capacity for the storage resource to be removed, the removal of the storage resource may be declined, and an error prompt message may be sent to the administrator.

At step 503, the user applications related to the to-be-removed resource is obtained.

If the idle storage capacity is less than the storage capacity of the storage resource to be removed, it indicates that after removing the storage resource to be removed, the storage device cannot provide sufficient storage capacity, such that it is necessary to migrate the user data stored on the storage resource to be removed to other storage device.

As previously mentioned, the user application corresponds to a virtual volume, while the virtual volume corresponds to a plurality of intermediate volumes which further correspond to a plurality of physical volumes, while further the physical volumes correspond to actual storage resources. Thus, it would be easy to obtain the user applications related to the storage resource to be removed.

At step 504, for each obtained user application, a target storage resource is selected on the other storage device, wherein the target storage resource has identical performance measurements to the source storage resource. Here the source storage resource is the storage resource corresponding to the user application on the storage device where the storage resource to be removed is located.

The process of selecting a target storage resource on other storage device is similar to the process as described at step 403. In brief, first, it is determined whether a target storage resource that has the identical performance measurements can be found on a single storage device among the other storage devices; if not, then the performance measurements of the source storage resource corresponding to the user application are halved, and then a second search is performed to determine whether target storage resources with halved performances measurements can be detected on two storage devices among other storage devices, respectively. And so forth. If a plurality of target storage resources with the same performance measurements are found on different storage devices, then screening may be carried out in accordance to the previously described criteria.

At step 505, the target storage resources are allocated to corresponding user application.

Optionally, if user data are stored in the storage resource corresponding to the user application on the storage device where the storage resource to be removed is located, then the user data stored in the storage resource to be removed are migrated to the selected target storage resource. For the part that is originally stored in the storage resource to be removed, it may be directly copied from the storage resource to be removed or recovered through a redundant mechanism.

After allocating the target storage resource to the corresponding user application and completing the migration of user data, the corresponding relation between the source storage resource and the user application is canceled.

At step 506, other storage resource is allocated on the storage device to replace the storage resource to be removed.

Optionally, if the user data are stored in the storage resource to be removed, then the user data are migrated to the other storage resource. User data may be directly copied from the storage resource to be removed or recovered through a redundant mechanism.

At step 507, the recorded metadata information is updated.

Because of removal of the storage resource, the metadata information about the intermediate volume corresponding to the storage device will change accordingly. Due to different system implementations, other metadata information may be required to be updated. The volume management device synchronizes the updated metadata information to respective intermediate volumes.

As previously mentioned, if the idle storage capacity is greater than the storage capacity of the storage resource to be removed, then the other storage resource may be directly allocated on the storage device to replace the storage resource to be removed. In this case, both the access rate and redundancy will not be affected. If the idle storage capacity is less than the storage capacity of the storage resource to be removed, then it is needed to find an alternative storage resource on other storage device; at this point, in addition to the storage capacity, the access rate and redundancy also need to be further considered. The so-called identical performance measurements refer to, besides having identical storage capacity, further having identical access rate and redundancy. For access rate, the idle storage access rate on the storage device where the target storage resource is located must be no less than the access rate of the storage resource corresponding to the user application on the storage device where the storage resource to be removed is located. For redundancy, the storage device where the target storage resource is located must be different from any storage device related to the user application.

Figure 6:
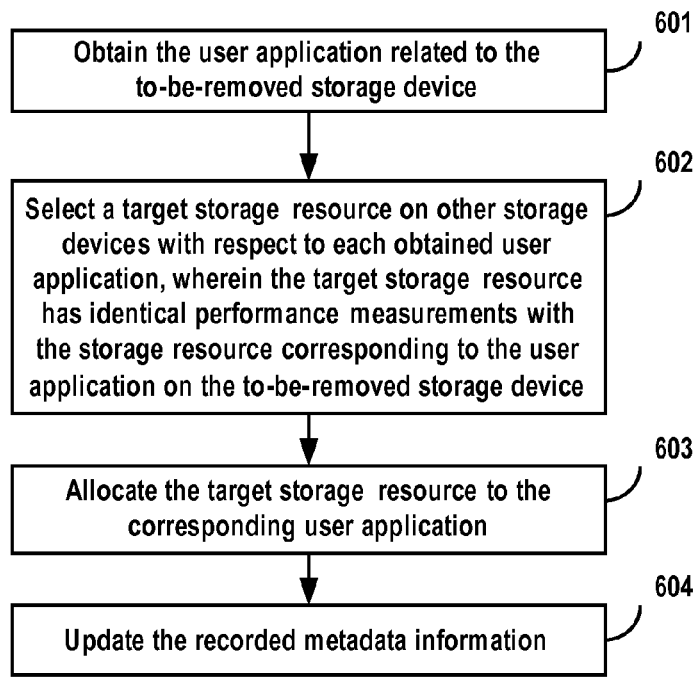

FIG. 6 is an operation process of removing a storage device from a system.

Removal of a storage device may be voluntarily initiated by an administrator of a cloud storage system in order to, for example, check or repair the storage device; or passively carried out when the storage device completely collapses due to failure such as power failure. As previously mentioned, the invention is particularly suitable in a scenario where a cloud storage system comprises low-end storage devices. The reliability of a single low-end storage device is relatively low, which may collapse completely due to failure. Through a provisioning system according to the invention, the influence of low reliability of a single low-end storage device on the high reliability of cloud storage may be eliminated.

At step 601, a user application related to a storage device to be removed is obtained.

The storage device to be removed corresponds to an intermediate volume, such that the user application related to the intermediate volume may be easily obtained.

At step 602, for each obtained user application, a target storage resource is selected on other storage device, wherein the target storage resource has identical performance measurements with the storage resource corresponding to the user application on the storage device to be removed.

The process of selecting a target storage resource on other storage device is similar to the process as described at step 403. In brief, first, it is determined whether a target storage resource that has the identical performance measurements can be found on a single storage device among the other storage devices; if not, then the performance measurements of the source storage resource corresponding to the user application are halved, and then a second search is performed to determine whether target storage resources with halved performances measurements can be detected on two storage devices among other storage devices, respectively. And so forth. If a plurality of target storage resources with the same performance measurements are found on different storage devices, then screening may be carried out in accordance to the previously described criteria.

It should be noted that since it involves allocating storage resources on the other storage device here, it is needed to guarantee that the target storage resource has identical measurements with the storage resource corresponding to the user application on the storage device to be removed. For storage capacity, the idle storage capacity on the storage device where the target storage resource is located must be no less than the storage capacity of the storage resource corresponding to the user application on the storage device to be removed. For access rate, the idle storage access rate on the storage device where the target storage resource is located must be no less than the access rate of the storage resource corresponding to the user application on the storage device to be removed. For redundancy, the storage device where the target storage resource is located must be different from any current storage device related to the user application.

At step 603, the target storage resources are allocated to corresponding user application.

Optionally, if the user data are stored in the storage device to be removed, then the user data are migrated to the target storage resource. User data may be directly copied from the storage resource to be removed or recovered through a redundant mechanism.

After allocating the target storage resource to the corresponding user application and completing the migration of user data, the corresponding relation between the source storage resource and the user application is canceled.

At step 604, the recorded metadata information is updated.

Due to removal of the storage device, the structure of the cloud storage system changes greatly, and the volume management device needs to update the metadata information. The volume management device synchronizes the updated metadata information to respective intermediate volumes.

For the cloud storage system, besides a change of the storage device state, the user application's requirements on storage resource may also change. For example, the user application may increase or decrease the requirements on the storage capacity, or may increase or decrease the requirements on access rate, or may require change of redundancy.

For redundancy change, for example, if the user application changes the redundancy requirement from RAID5 into Mirror, then the provisioning system creates a service requirement for mirror, and then the user data is migrated from the current RAID5 service request to the Mirror service request. It is common knowledge in the art to change the redundancy, which will not be detailed here.

If the user application lowers the requirement on storage capacity or access rate, the only thing need to do is to collect corresponding storage capacity or access rate from the storage resource allocated to the user application. It should be noted that this collection is carried out in average with respect to respective storage devices, i.e., respective intermediate volumes, corresponding to the user application. In the aforementioned example, suppose the user application has the following requirements on storage resource:

redundancy: RAID5(4+P)
storage capacity: 800 GB
access rate: 10000 IPOS

The storage resources actually allocated to the user application are 4 storage resources A, B, C, and D that may provide 200 GB, 2000IOPS, respectively, and 2 storage resources E1, E2 that may provide 100 GB, 1000IOPS, respectively. If the user application's requirements on storage resource are currently changed to:

redundancy: RAID5(4+P)
storage capacity: 400 GB
access rate: 5000 IPOS

The storage resources actually allocated to the user application after collection are 4 storage resources A, B, C, and D that may provide 100 GB, 1000IOPS, respectively, and 2 storage resources E1, E2 that may provide 50 GB, 500IOPS, respectively.

Figure 7:
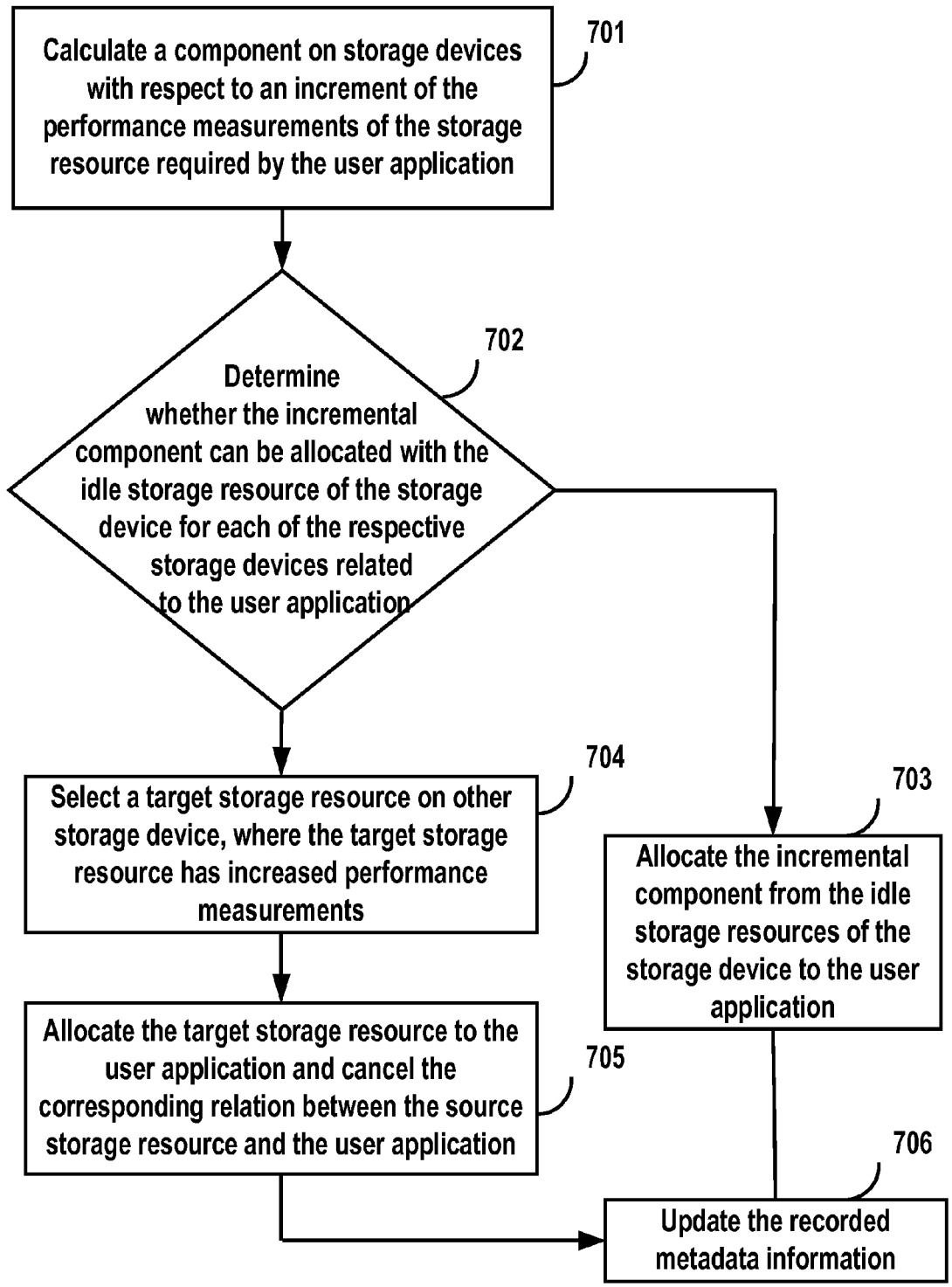
FIG. 7 is an operational flow chart when a user application increases requirements on performance measurements.

If the user application increases the requirements on performances measurements such as storage capacity or access rate, then it is processed according to the flow chart of FIG. 7. In FIG. 7, the illustration is made with an example where the user application increases the requirements on the storage capacity. Increase of access rate is processed in a similar manner.

At step 701, components on respective storage devices related to the user application are calculated with respect to the increments of the storage resource performance measurements required by the user application.

With reference to the above example, where the storage resources actually allocated to the user application are 4 storage resources A, B, C, and D each providing 200 GB, 2000IOPS, respectively, and 2 storage resources E1, E2 each providing 100 GB, 1000IOPS, respectively. If the user application's requirement on storage capacity is 1600G, then the increment is evenly distributed to respectively storage devices related to the user application. Specifically, a 200 GB incremental component is distributed on the storage devices where the storage resources A, B, C, D are located, and a 100 GB incremental component is distributed on the storage devices where E1 and E2 are located.

At step 702, for each of the respective storage devices related to the user application, it is determined whether the incremental component can be allocated among the idle storage resources of the storage device. If yes, then the process proceeds with step 703; otherwise, it proceeds with step 704.

Here, it is determined whether the incremental component can be allocated among the idle storage resources of the storage device, which actually determines whether the incremental component is no greater than the idle storage resources of the storage device.

According to one embodiment of the invention, when the incremental component cannot be allocated from the idle storage resources of the storage device, it may decline the request and return an error prompt message.

At step 703, the incremental component is allocated from the idle storage resources of the storage device to the user application.

At step 704, a target storage resource is selected on other storage device, where the target storage resource has increased performance measurements.

The process of selecting a target storage resource on other storage device is similar to the process as described at step 403. In brief, first, it is determined whether a target storage resource that has the increased performance measurements can be found on a single storage device among the other storage devices. If the increased performance measurements are not found, then they are halved, and a second search is performed to determine whether target storage resources with halved performances measurements can be detected on two storage devices among other storage devices, respectively, and so forth. If a plurality of target storage resources with the increased performance measurements are found on different storage devices, then screening may be carried out in accordance to the previously described criteria.

In order to guarantee redundancy, the storage device where the target storage resource is located must be different from any current storage device related to the user application.

At step 705, the target storage resources are allocated to corresponding user application.

The source storage resource here means the storage resource corresponding to the user application on the storage device whose idle storage resource is less than the incremental component.

Optionally, the user data stored in the source storage resource are migrated to the target storage resource.

After allocating the target storage resource to the user application and completing the migration of user data, the corresponding relation between the source storage resource and the user application is canceled.

At step 706, the recorded metadata information is updated.

Through the provisioning system according to embodiments of the invention, on one hand, management of the cloud storage environment may be carried out in a simpler way. The administrator of the cloud storage only needs to provide the information about the storage device to the provisioning system, and then the provisioning system may monitor the storage resource that may be provided by the storage device in the aforementioned way. On the other hand, a better service may be provided to the user. The user only needs to provide the requirements on the performance measurements of the storage resource to the provisioning system.

Because the user data are allocated on a plurality of storage devices, the storage devices in the cloud storage may be given a full play. The maximum amount of the storage resources available to the user application far exceeds the scenario of merely using a single storage device. Besides, due to participation of a plurality of storage devices, when the user's requirements on the performance measurements of the storage device changes or when one of the selected storage devices fails, re-allocation may be quickly carried out.

Generally, a low-end storage device may process disk failure through RAID, but cannot process the physical failure, for example, power failure, of the whole storage device. The provisioning system according to the embodiments of the invention considers the scenario where the whole storage device fails, and even if the low-end storage device does not support RAS or copy function, the user data may also be allocated to a plurality of storage devices to thereby implementing the redundancy required by the user. As previously mentioned, parity check operation is carried out with respect to the user data blocks to thereby obtain redundant data blocks, and corresponding user data blocks and redundant data blocks may be put onto different storage devices, respectively. Thus, when a storage device fails, it does not affect the access to user data. After failure is detected, re-allocation may be carried out quickly to recover the state before failure.

According to a traditional provisioning system, the storage capacity is provided by a storage device. When the requirement on the storage capacity is greater than the maximum storage capacity of the storage device, the user's requirement on storage capacity cannot be satisfied. According to the embodiments of the invention, the user data are distributed on a plurality of storage devices, thereby guaranteeing that the user's requirement on storage capacity may be satisfied.

Figure 8:
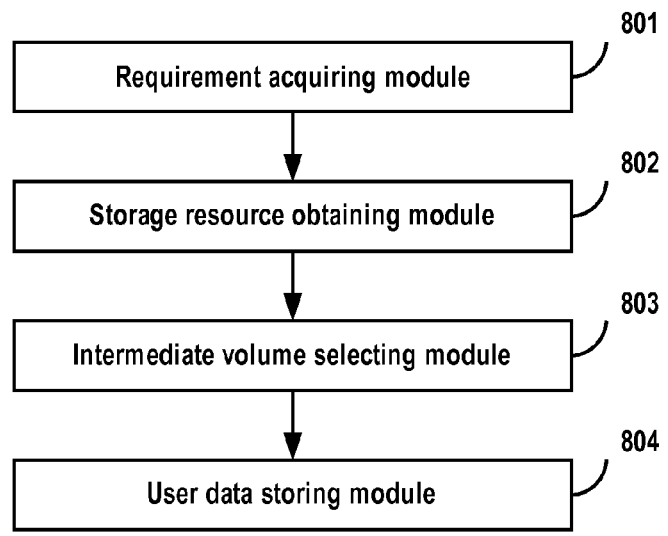
FIG. 8 is a block diagram of an apparatus for managing storage devices according to an embodiment of the invention.

FIG. 8 is a block diagram of an apparatus for managing storage devices according to an embodiment of the invention. In this embodiment, the storage resources provided by respective storage devices may be virtually integrated into corresponding intermediate volumes, respectively, and a plurality of intermediate volumes are virtually integrated into individual logical volumes. The apparatus comprises:

a requirement acquiring module configured to acquire requirements on storage resources filed or presented to the logical volume, the requirements at least comprising redundancy;

a storage resource obtaining module configured to obtain the storage resource available to respective intermediate volumes;

an intermediate volume selecting module configured to select intermediate volumes based on the requirements on the storage resources and the storage resources available from the respective intermediate volumes, wherein the minimum number of the intermediate volumes is determined based on the redundancy; and a user data storage module configured to store user data into the selected intermediate volumes according the requirement on redundancy.

The flowcharts and block in the figures illustrate the system, methods, as well as architecture, functions and operations executable by a computer program product according to the embodiments of the invention. In this regard, each block in the flowcharts or block may represent a module, a program segment, or a part of code, which contains one or more executable instructions for performing specified logic functions. It should be noted that in some alternative implementations, functions indicated in blocks may occur in an order differing from the order as shown in the figures. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

Though the system and method for web analytics according to the invention has been described in detail with reference to preferred embodiments, the invention is not limited to this. A person of normal skill in the art can make various changes, alterations and modifications to the invention under the teaching of the description without departing from the spirit and scope of the invention. It should be understood that all such changes, alterations, and modifications still fall into the protection scope of the invention. The protection scope of the invention is defined by the appending claims.

What is claimed is:

1. A method of managing storage devices comprising storage resources virtually integrated into corresponding intermediate volumes, the intermediate volumes being virtually integrated into individual logical volumes, the method comprising:

acquiring requirements on storage resources presented to the logical volumes, the requirements comprising a requirement on redundancy;

obtaining storage resources respectively available from the intermediate volumes;

selecting the intermediate volumes based on the storage resource requirements and the storage resources respectively available from the intermediate volumes so as to satisfy the storage resource requirements, wherein a minimum number of the intermediate volumes is determined based on the redundancy requirement; and storing user data into the selected intermediate volumes based on the redundancy requirement.

2. The method according to claim 1, further comprising:
receiving an instruction to remove a storage resource associated with a particular intermediate volume;
obtaining an idle storage capacity on the particular intermediate volume and a storage capacity of the storage resource to be removed;
allocating other storage resources on the particular intermediate volume to replace the storage resource to be removed if the idle storage capacity is greater than the storage capacity of the storage resource to be removed.

3. The method according to claim 2, further comprising:
obtaining logical volumes corresponding to the storage resource to be removed if the idle storage capacity on the particular intermediate volume is less than the storage capacity of the storage resource to be removed;
selecting a target storage resource on other intermediate volumes with respect to each obtained logical volume, wherein the target storage resource has identical performance measurements with a source storage resource, and the source storage resource is a storage resource corresponding to a particular logical volume on the particular intermediate volume; and
allocating the target storage resource to the corresponding particular logical volume.

4. The method according to claim 1, further comprising:
receiving an instruction to remove one of the intermediate volumes;
obtaining logical volumes related to the intermediate volume to be removed;
selecting a target storage resource on other intermediate volumes with respect to each obtained logical volume, wherein the target storage resource has identical performance measurements with a source storage resource, and the source storage resource is a storage resource corresponding to a particular logical volume on the intermediate volume to be removed; and
allocating the target storage resource to the particular logical volume.

5. The method according to claim 1, further comprising:
receiving an instruction to increase storage resources with respect to a particular logical volume, the instruction comprising an increment of performance measurements of the storage resources;
calculating a component of the increment for each intermediate volume related to the particular logical volume; and
allocating the increment components to the particular logical volume using idle storage resources of a first intermediate volume.

6. The method according to claim 5, further comprising:
selecting a target storage resource on a second intermediate volume if the increment components cannot be allocated using the idle storage resources of the first intermediate volume, wherein the target storage resource has increased performance measurements; and
allocating the selected target storage resource to the particular logical volume.

7. An apparatus for managing storage devices comprising storage resources virtually integrated into corresponding intermediate volumes, the intermediate volumes being virtually integrated into logical volumes, the apparatus comprising:

a requirement acquiring module configured to acquire storage resource requirements presented to the logical volumes, the storage resource requirements comprising a redundancy requirement;

a storage resource obtaining module configured to obtain storage resources available from the intermediate volumes;

an intermediate volume selecting module configured to select intermediate volumes based on the storage resource requirements and the storage resources available from the respective intermediate volumes, wherein a minimum number of the intermediate volumes is determined based on the redundancy requirement; and a user data storage module configured to store user data in the selected intermediate volumes according the redundancy requirement.

8. The apparatus according to claim 7, further comprising:
a first module configured to receive an instruction to remove a first storage resource from a particular intermediate volumes;
a second module configured to obtain an idle storage capacity on the particular intermediate volume and storage capacity of the storage resource to be removed;
a third module configured to allocate a second storage resource from the particular intermediate volume to replace the first storage resource to be removed if the idle storage capacity on the particular intermediate volume is greater than the storage capacity of the first storage resource to be removed.

9. The apparatus according to claim 8, further comprising:
a fourth module configured to obtain logical volumes corresponding to the first storage resource to be removed if the idle storage capacity on the particular intermediate volume is less than the storage capacity of the first storage resource to be removed;
a fifth module configured to select a target storage resource on another intermediate volume with respect to each obtained logical volume, wherein the target storage resource has identical performance measurements with a source storage resource, and the source storage resource is a storage resource corresponding to a particular logical volume on the intermediate volume where the storage resource to be removed is located; and
a sixth module configured to allocate the target storage resource to the corresponding particular logical volume.

10. The apparatus according to claim 7, further comprising:
a first module configured to receive an instruction to remove one of the intermediate volumes;
a second module configured to obtain logical volumes related to the intermediate volume to be removed;
a third module configured to select a target storage resource on another intermediate volume with respect to each obtained logical volume, wherein the target storage resource has identical performance measurements with a source storage resource, and the source storage resource is a storage resource corresponding to a particular logical volume on the intermediate volume to be removed; and a fourth module configured to allocate the target storage resource to said corresponding particular logical volume.

11. The apparatus according to claim 7, further comprising:

a first module configured to receive an instruction to increase storage resources with respect to a particular logical volume, the instruction comprising an increment of performance measurements of the storage resources;

a second module configured to calculate a component of the increment for each intermediate volume related to the particular logical volume;

a third module configured to allocate the increment components to the particular logical volume using idle storage resources of a first intermediate volume.

12. The apparatus according to claim 11, further comprising:

a fourth module configured to select a target storage resource on a second intermediate volume if the increment components cannot be allocated to the particular logical volume using idle storage resources of a first intermediate volume; and a fifth module configured to allocate the target storage resource to the particular logical volume.

13. A computer program product for managing storage devices comprising storage resources virtually integrated into corresponding intermediate volumes, the intermediate volumes being virtually integrated into individual logical volumes, the computer program product comprising a computer readable storage medium including computer instructions for:

acquiring requirements on storage resources presented to the logical volumes, the requirements comprising a requirement on redundancy;

obtaining storage resources respectively available from the intermediate volumes;

selecting the intermediate volumes based on the storage resource requirements and the storage resources respectively available from the intermediate volumes so as to satisfy the storage resource requirements, wherein a minimum number of the intermediate volumes is determined based on the redundancy requirement; and storing user data into the selected intermediate volumes based on the redundancy requirement.

14. The computer program product according to claim 13, further comprising computer instructions for:

receiving an instruction to remove a storage resource associated with a particular intermediate volume;

obtaining an idle storage capacity on the particular intermediate volume and a storage capacity of the storage resource to be removed;

allocating other storage resources on the particular intermediate volume to replace the storage resource to be removed if the idle storage capacity is greater than the storage capacity of the storage resource to be removed.

15. The computer program product according to claim 14, further comprising computer instructions for:

obtaining logical volumes corresponding to the storage resource to be removed if the idle storage capacity on the particular intermediate volume is less than the storage capacity of the storage resource to be removed;

selecting a target storage resource on other intermediate volumes with respect to each obtained logical volume, wherein the target storage resource has identical performance measurements with a source storage resource, and the source storage resource is a storage resource corresponding to a particular logical volume on the particular intermediate volume; and allocating the target storage resource to the corresponding particular logical volume.

16. The computer program product according to claim 13, further comprising computer instructions for:

receiving an instruction to remove one of the intermediate volumes;

obtaining logical volumes related to the intermediate volume to be removed;

selecting a target storage resource on other intermediate volumes with respect to each obtained logical volume, wherein the target storage resource has identical performance measurements with a source storage resource, and the source storage resource is a storage resource corresponding to a particular logical volume on the intermediate volume to be removed; and allocating the target storage resource to the particular logical volume.

17. The computer program product according to claim 13, further comprising computer instructions for:

receiving an instruction to increase storage resources with respect to a particular logical volume, the instruction comprising an increment of performance measurements of the storage resources;

calculating a component of the increment for each intermediate volume related to the particular logical volume; and allocating the increment components to the particular logical volume using idle storage resources of a first intermediate volume.

18. The computer program product according to claim 17, further comprising computer instructions for:

selecting a target storage resource on a second intermediate volume if the increment components cannot be allocated using the idle storage resources of the first intermediate volume, wherein the target storage resource has increased performance measurements; and allocating the selected target storage resource to the particular logical volume.

* * * * *